United States Patent
Wen

(10) Patent No.: US 12,351,403 B2
(45) Date of Patent: Jul. 8, 2025

(54) MATERIAL HANDLING DEVICE

(71) Applicant: SHENZHEN HONGXUN M&E CO., LTD., Guangdong (CN)

(72) Inventor: Xianshan Wen, Guangdong (CN)

(73) Assignee: SHENZHEN HONGXUN M&E CO., LTD., Guangdong (CN)

( * ) Notice: Subject to any disclaimer, the term of this patent is extended or adjusted under 35 U.S.C. 154(b) by 107 days.

(21) Appl. No.: 18/267,970

(22) PCT Filed: Dec. 17, 2020

(86) PCT No.: PCT/CN2020/137289
§ 371 (c)(1),
(2) Date: Jun. 16, 2023

(87) PCT Pub. No.: WO2022/126518
PCT Pub. Date: Jun. 23, 2022

(65) Prior Publication Data
US 2024/0067461 A1    Feb. 29, 2024

(51) Int. Cl.
*B65G 39/18* (2006.01)
*B07C 5/34* (2006.01)
(Continued)

(52) U.S. Cl.
CPC ............... *B65G 47/31* (2013.01); *B07C 5/34* (2013.01); *B65G 39/18* (2013.01); *B65G 47/24* (2013.01);
(Continued)

(58) Field of Classification Search
CPC ........ B65G 47/31; B65G 39/18; B65G 47/24; B65G 47/883; B65G 2203/044; B65G 2205/04
(Continued)

(56) References Cited

U.S. PATENT DOCUMENTS 8,534,451 B2 *  9/2013  Damen ............... B65G 47/682
                                                      198/367
12,116,217 B2 * 10/2024  Begert ................ B65G 47/681
(Continued)

FOREIGN PATENT DOCUMENTS

CN       1100061 A     3/1995
CN     203794101 U     8/2014
(Continued)

OTHER PUBLICATIONS

International Search Report dated Septemeber 23, 2021; International Applicatin No. PCT/CN2020/137289; 2 pages (English).
International Search Report dated Septemeber 23, 2021; International Applicatin No. PCT/CN2020/137289; 3 pages (non-English).
(Continued)

Primary Examiner — Gene O Crawford
Assistant Examiner — Lester Ill Rushin
(74) Attorney, Agent, or Firm — CANTOR COLBURN LLP

(57) ABSTRACT

A material handling device (1), including: a conveying mechanism (10), the conveying mechanism comprising a first conveying platform (11) and a second conveying platform (12) that are coplanar and arranged side by side, the first conveying platform being provided with a feeding position (101), the second conveying platform being provided with a discharging position (102), the conveying speed of the second conveying platform being greater than the conveying speed of the first conveying platform; and a screening mechanism provided between the feeding position and the discharging position. The material handling device provided in the present application conveys workpieces by means of the first conveying platform and second conveying platform that are coplanar and arranged side by side.

13 Claims, 5 Drawing Sheets

(51) Int. Cl.
  *B65G 47/24* (2006.01)
  *B65G 47/31* (2006.01)
  *B65G 47/88* (2006.01)

(52) U.S. Cl.
  CPC ...... *B65G 47/883* (2013.01); *B65G 2203/044* (2013.01); *B65G 2205/04* (2013.01)

(58) Field of Classification Search
  USPC .......................................................... 198/382
  See application file for complete search history.

(56) References Cited

U.S. PATENT DOCUMENTS

| | | |
|---|---|---|
| 2009/0308714 A1 | 12/2009 | Charpentier et al. |
| 2016/0016738 A1* | 1/2016 | Koetje ................. B65G 47/681 198/458 |
| 2021/0039894 A1* | 2/2021 | Kasai ................. B65G 47/1428 |
| 2023/0365344 A1* | 11/2023 | Mart? Sala ............ B65G 47/90 |

FOREIGN PATENT DOCUMENTS

| | | |
|---|---|---|
| CN | 110342202 A | 10/2019 |
| CN | 111032538 A | 4/2020 |
| CN | 210557421 U | 5/2020 |
| CN | 2146516586 | * 11/2021 |
| JP | 2007039142 A | 2/2007 |

OTHER PUBLICATIONS

Written Opinion dated Sep. 23, 2021; International Applicatin No. PCT/CN2020/137289; 3 pages (non-English).

* cited by examiner

MATERIAL HANDLING DEVICE

CROSS-REFERENCE TO RELATED APPLICATIONS

This application is a U.S. national phase of International Patent Application No. PCT/CN2020/137289 with an international filing date of Dec. 17, 2020, designating the U.S., now pending, the entire contents of which are incorporated herein by reference.

TECHNICAL FIELD

The present application relates to the technical field of material supply devices, and in particular, to a material handling device.

BACKGROUND

In modern industrial production, disordered workpieces need to be arranged in an orderly manner before they are conveyed to automatic assembly equipment for assembly or to automatic machining equipment for processing. At present, vibration discs or non-coplanar centrifugal discs are generally used to achieve the above process, however, in the process of using vibration discs to screen or change the attitude of the workpiece, violent collision and friction between the workpieces will easily lead to damage to the workpiece, and due to the gap between the double centrifugal discs, non-coplanar centrifugal discs are not suitable for the screening or attitude change of smaller workpieces, so it is an urgent technical problem to be solved to achieve the screening and high-speed output of the workpiece with a balance of versatility and less damage.

SUMMARY

An objective of the present application is to provide a material handling device, including but not limited to achieving the screening and high-speed output of the workpiece with a balance of versatility and less damage.

A technical proposal provided by the present application is: a material handling device, including:
  a conveying mechanism, including a first conveying platform and a second conveying platform which are co-planar and arranged alongside each other, the first conveying platform being provided with a feeding position, the second conveying platform being provided with a discharging position, a conveying speed of the second conveying platform being greater than a conveying speed of the first conveying platform, so that workpieces are arranged at intervals and output at a high speed; and
  a screening mechanism disposed between the feeding position and the discharging position, and the screening mechanism being located on a top side of the first conveying platform and a top side of the second conveying platform for smoothly transitioning the workpieces from the first conveying platform to the second conveying platform and for outputting the workpieces one by one from the discharging position in a desired attitude.

In an embodiment, the first conveying platform and the second conveying platform have an annular shape and are coaxial, and the first conveying platform surrounds an outer periphery of a feeding inlet and the second conveying platform surrounds an outer periphery of the first conveying platform.

In an embodiment, the first conveying platform includes a first horizontal plane and an inclined plane extending downwardly in an oblique manner, and the inclined plane is abutted to an inner side of the first horizontal plane.

In an embodiment, the material handling device further includes:
  an arc-shaped baffle, disposed between the first conveying platform and the second conveying platform and aligned with the feeding position, to block the workpieces so that the workpieces accumulate on the feeding position.

In an embodiment, the screening mechanism includes:
  a width adjustment assembly, the width adjustment assembly including a first roller and a first roller driving member, the first roller being disposed on the top side of the first conveying platform and located downstream of the feeding position for obstructing the first conveying platform so that a width on a side of the first conveying platform close to a workpiece recycling opening only allows one workpiece to pass, and the first roller driving member being in a transmission connection to the first roller for driving the first roller to rotate in a direction along which a tangential direction of the first roller is in line with a moving direction of the workpiece, and a rotation speed of the first roller being in line with the conveying speed of the first conveying platform.

In an embodiment, the screening mechanism further includes:
  a height adjustment assembly, the height adjustment assembly including a second roller and a second roller driving member, the second roller being provided on the top side of the first conveying platform and located downstream of a width adjustment station, and a distance between a bottom surface of the second roller and a top surface of the first conveying platform allowing a workpiece in a lowest attitude to pass, the second roller driving member being in a transmission connection with the second roller for driving the second roller to rotate so as to force stacked workpieces to fall into the workpiece recycling opening.

In an embodiment, the screening mechanism further includes:
  a first guiding assembly, the first guiding assembly including a third roller and a third roller driving member, the third roller being disposed on the top side of the first conveying platform and located downstream of a height adjustment station, and the third roller driving member being in a transmission connection with the third roller for driving the third roller to rotate so as to force the workpiece to move toward the second conveying platform.

In an embodiment, a deceleration belt is disposed on an edge of the second conveying platform close to the first conveying platform, and the third roller is disposed on a top side of the deceleration belt to drive the workpiece toward a side of the second conveying platform away from the deceleration belt.

In an embodiment, the screening mechanism further includes:
  a first screening assembly, the first screening assembly including a first identification member and a first pickout member, the first identification member being disposed on the top side of the second conveying platform and located downstream of a first guiding station for identifying an attitude of the workpiece, and the first pick-out member being located on a side of the second conveying platform away from the workpiece recycling opening and downstream of a first identification station for sending a workpiece identified as unqualified into the workpiece recycling opening.

In an embodiment, the screening mechanism further includes:

a second screening assembly, the second screening assembly including a second identification member and a second pick-out member, the second identification member being disposed on the top side of the second conveying platform and located downstream of a first pick-out station for identifying the attitude of the workpiece, and the second pick-out member being disposed on the side of the second conveying platform away from the workpiece recycling opening and located downstream of a second identification station for sending a workpiece identified as unqualified into the workpiece recycling opening.

In an embodiment, the screening mechanism further includes:

a second guiding assembly, the second guiding assembly including a fourth roller and a fourth roller driving member, the fourth roller being disposed on the top side of the first conveying platform and located at the discharging position, the fourth roller driving member being in a transmission connection with the fourth roller for driving the fourth roller to rotate so as to move the workpiece toward a discharging opening.

In an embodiment, the material handling device further includes:

a shield board, disposed on a side of the second conveying platform away from the first conveying platform, so as to prevent the workpiece from falling off the second conveying platform from the side away from the first conveying platform; the first roller driving member, the second roller driving member, the third roller driving member, the fourth roller driving member, the first identification member and the first pick-out member being mounted on the shield board.

The advantageous effects of the material handling device provided by the embodiment of the present application are that the conveying mechanism and the screening mechanism are cooperated, and the workpieces are conveyed by the first conveying platform and the second conveying platform which are co-planar and arranged alongside each other, and since there is no gap between the first conveying platform and the second conveying platform, it is suitable for workpieces of any volume, and since the conveying process is smooth and has low vibration, so it does not lead to violent collisions or friction between the workpieces, which effectively reduces damage to the workpieces. Moreover, because the conveying speed of the second conveying platform is faster, the workpieces can be output at a certain interval and at high speed, thus solving the technical problem of how to achieve the screening and high-speed output of workpieces by taking into account versatility and less damage, which is conducive to ensuring the accuracy of workpiece assembly and improving the production efficiency of workpiece assembly.

BRIEF DESCRIPTION OF THE DRAWINGS

In order to more clearly illustrate the technical proposals in the embodiments of the present application, the accompanying drawings used in the embodiments or the exemplary technology will be briefly introduced. The accompanying drawings in the following description are only the corresponding accompanying drawings of some embodiments of the present invention, and other drawings may be obtained from these drawings without creative effort by a person of ordinary skill in the art.

Figure 1:
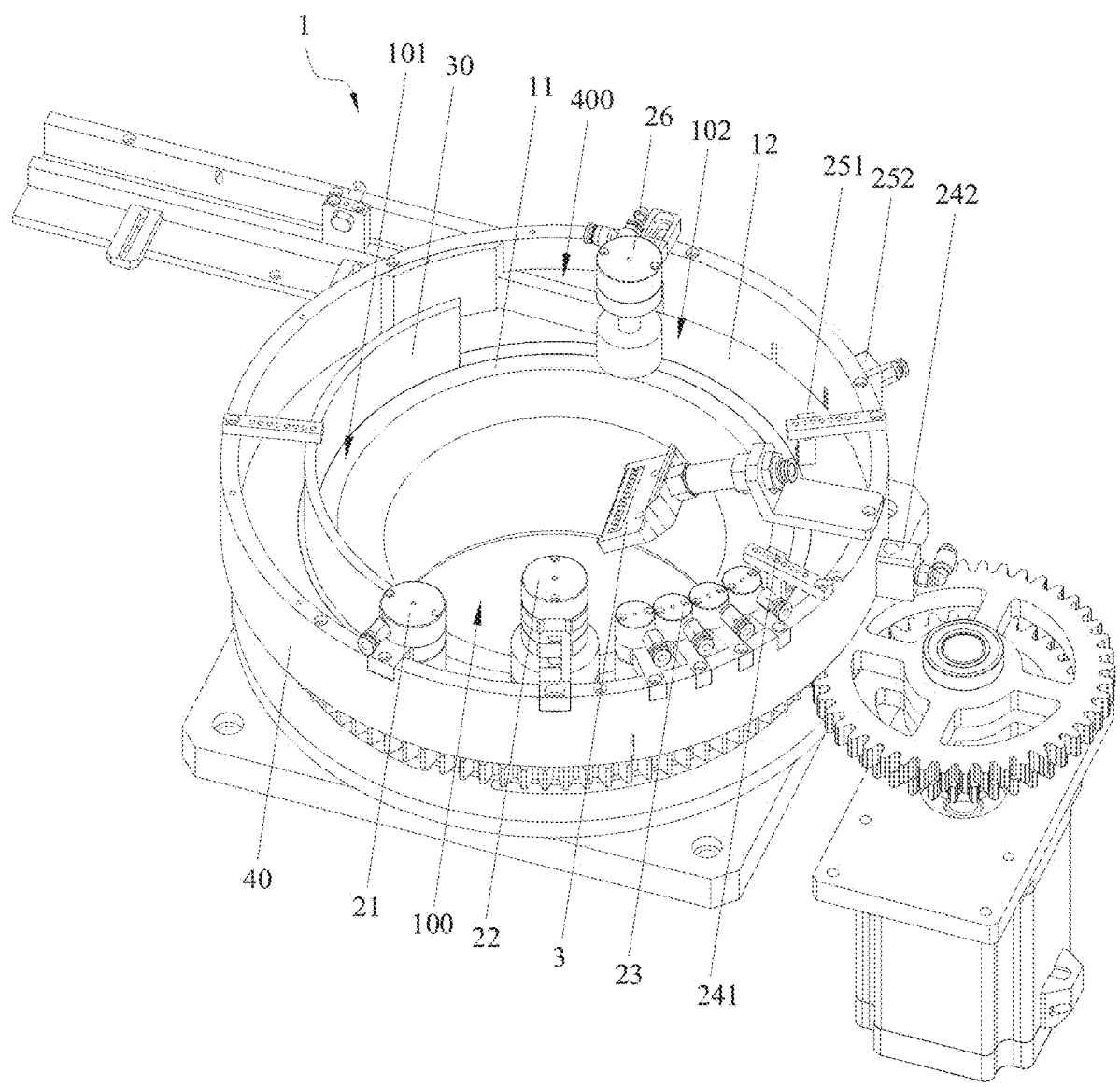
FIG. 1 is a perspective view of the material handling device provided by an embodiment of the present application.

Reference numbers in the drawings are as follows

1—material handling device, 2—workpiece, 3—feeding assembly;

10—conveying mechanism, 11—first conveying platform, 12—second conveying platform, 13—platform driving assembly, 14—transmission assembly, 100—feeding inlet, 101—feeding position, 102—discharging position, 111—first horizontal plane, 112—inclined plane, 121—second horizontal plane, 122—deceleration belt;

21—width adjustment assembly, 22—height adjustment assembly, 23—first guiding assembly, 24—first screening assembly, 25—second screening assembly, 26—second guiding assembly, 211—first roller, 212—first roller driving member, 213—width adjustment bracket, 221—second roller, 222—second roller driving member, 223—height adjustment bracket, 241—first identification member, 242—first pick-out member, 243—first identification bracket, 251—second identification member, 252—second pick-out member, 2420—spray nozzle, 2421—first chamber, 2422—air inlet;

30—arc-shaped baffle, 300—baffle bracket;

40—shield board, and 400—discharging outlet.

DETAILED DESCRIPTION OF THE EMBODIMENTS

In order to make the purpose, technical proposals, and advantages of the present application clearer, the present application will be described in detail below in conjunction with the accompanying drawings and embodiments. It should be understood that the specific embodiments described here are only to explain the present application, not to limit the present application.

It is noted that when a component is referred to as "fixed to" or "disposed on" another component, it may be directly on the other component or indirectly on the other component. When a component is referred to as being "connected" to another component, it may be directly or indirectly connected to the other component. The terms "up", "down", "left", "right", etc. indicating the orientation or position relationship are based on the orientation or position relationship shown in the accompanying drawings, and are only for the convenience of description, not to indicate or imply that the device or component referred to must have a specific orientation, constructed and operated in a specific orientation, and therefore cannot be understood as a limitation to this application, for those of ordinary skill in the art, the specific meaning of the above terms can be understood according to the specific circumstances. The terms "first" and "second" are only used for descriptive purposes, and cannot be understood as indicating or implying relative importance or implicitly specifying the quantity of technical features. "A plurality of" means two or more, "end" refers to a face, a line or a point of a component, and "end part" refers to a partial part of a component, unless otherwise expressly and specifically defined.

Figure 2:
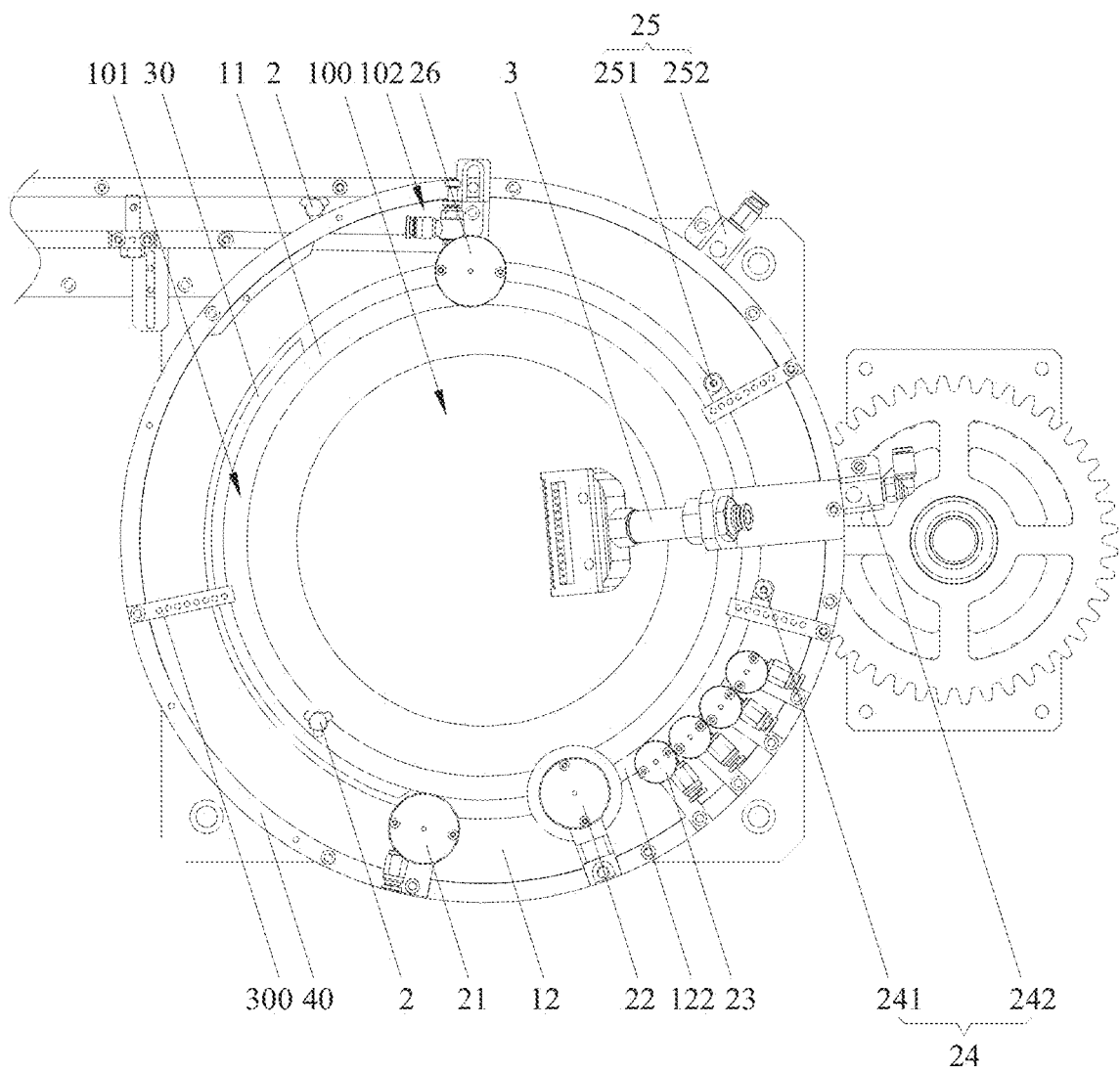
FIG. 2 is a top view of the material handling device provided by the embodiment of the present application.
Figure 3:
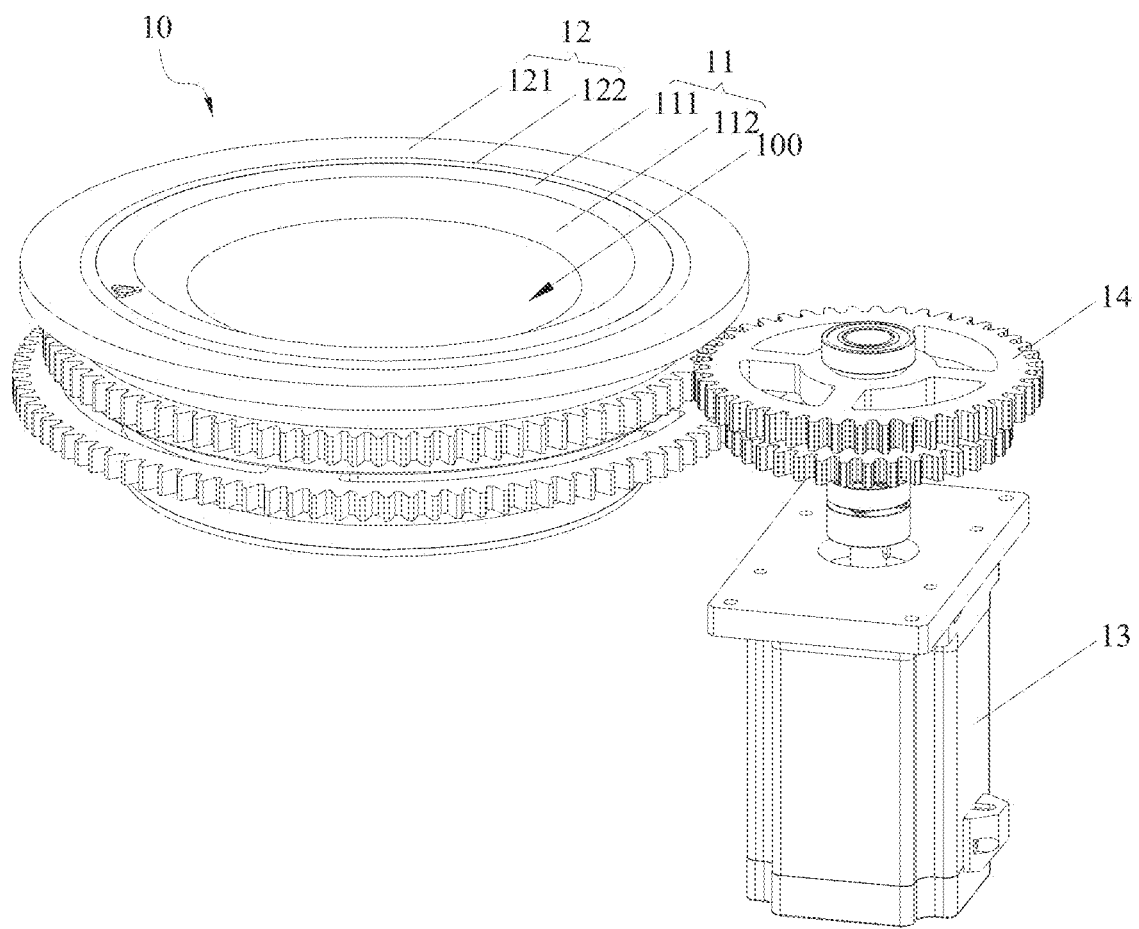
FIG. 3 is a perspective view of the conveying mechanism of the material handling device provided by the embodiment of the present application.

Referring to FIGS. 1 to 3, a material handling device 1 provided by the present application includes a conveying mechanism 10 and a screening mechanism. The conveying mechanism 10 includes a first conveying platform 11 and a second conveying platform 12 which are co-planar and arranged alongside each other, the first conveying platform 11 is provided with a feeding position 101, the second conveying platform 12 is provided with a discharging position 102, and a conveying speed of the second conveying platform 12 being greater than a conveying speed of the first conveying platform 11, so that workpieces 2 are arranged at intervals and output at a high speed; the screening mechanism is disposed between the feeding position 101 and the discharging position 102, and the screening mechanism is located on a top side of the first conveying platform 11 and the second conveying platform 12 for smoothly transitioning the workpieces 2 from the first conveying platform 11 to the second conveying platform 12 and for outputting the workpieces 2 one by one from the discharging position 102 in a desired attitude. It can be understood that the conveying mechanism 10 and the screening mechanism operate according to the instructions of a control device, and the entire process of conveying and sorting the workpieces 2 is under the control of the control device.

Before conveying the workpieces 2 to an automatic assembly apparatus or an automatic processing apparatus, the workpieces 2 are first delivered by a feeding assembly 3 from a feeding inlet 100 to the feeding position 101 of the first conveying platform 11, and then the workpieces 2 are conveyed on the first conveying platform 11, during which the screening mechanism sorts the workpieces 2 stacked on the first conveying platform 11 so that the workpieces 2 pass one by one from the first conveying platform 11 onto the second conveying platform 12. When the workpieces 2 enter the second conveying platform 12 from the first conveying platform 11, the conveying speed of the second conveying platform 12 is greater than the conveying speed of the first conveying platform 11, so that the workpieces 2 are arranged on the second conveying platform 12 with a certain spacing, and then continue to pass the screening mechanism successively, and the screening mechanism kicks a workpiece 2 with unqualified attitude out of the second conveying platform 12, and then the second conveying platform 12 rapidly conveys the workpieces 2 with qualified attitude out of the material handling device 1 through the discharging position 102, completing the sorting of the workpieces 2 and preparing them for entering the automatic assembly apparatus or automatic processing apparatus.

The present application provides a material handling device 1 that employs a conveying mechanism 10 in cooperation with a screening mechanism to convey workpieces 2 by means of a first conveying platform 11 and a second conveying platform 12 that are coplanar and arranged alongside each other, and since there is no gap between the first conveying platform 11 and the second conveying platform 12, it is applicable to workpieces 2 of any volume, and since the conveying process is smooth and has low vibration, therefore it does not cause violent collisions or friction between the workpieces 2, thus effectively reducing the damage to the workpieces 2, and because the conveying speed of the second conveying platform 12 is faster, the workpieces 2 can be output at a certain interval and at high speed, thereby achieving the screening and high-speed output of the workpieces by taking into account the versatility and less damage, which is conducive to ensuring the accuracy of the workpiece assembly and improving the production efficiency of the workpiece assembly.

Optionally, referring to FIGS. 1 to 3, as a specific embodiment of the material handling device provided in the present application, the first conveying platform 11 and the second conveying platform 12 have an annular structure, and the first conveying platform 11 is coaxial with the second conveying platform 12, with the first conveying platform 11 surrounding the outer periphery of the feeding inlet 100 and the second conveying platform 12 surrounding the outer periphery of the first conveying platform 11. Specifically, both the first conveying platform 11 and the second conveying platform 12 are annular discs, and the second conveying platform 12 is sleeved on the outer side of the first conveying platform 11. An inner hole of the first conveying platform 11 may be in communication with a material storage device, which is both a material discharging outlet and a workpiece recycling opening of the material storage device and a feeding inlet 100 of the material handling device 1, so that the workpieces 2 can be blown out of the inner hole of the first conveying platform 11 by the material feeding assembly 3 and fall on the feeding position 101. The workpieces 2 that do not meet the attitude requirements can be recycled to the storage device through the inner hole of the first conveying platform 11 and immediately return to the feeding state, saving the process between the recycling and reuse of the workpieces 2, thus effectively improving the efficiency of the recycling of the workpieces 2.

In this embodiment, the conveying mechanism 10 further includes a platform driving assembly 13 and a transmission assembly 14. The platform driving assembly 13 may be an electric motor or a hydraulic motor, or the like, and the transmission assembly 14 includes at least two gear sets or two timing wheel sets and two timing belts, or the like, with one of the gears of the gear sets or one of the timing wheels of the timing wheel sets being connected to an output shaft of the platform driving assembly 13. The first conveying platform 11 is coaxial with and fixedly connected to another gear of one of the gear sets or another timing wheel of one of the timing wheel sets, and the second conveying platform 12 is coaxial with and fixedly connected to another gear of the other gear set or another timing wheel of the other timing wheel set, so that the first conveying platform 11 and the second conveying platform 12 can be driven by the cooperation between the platform driving assembly 13 and the transmission assembly 14 to realize differential speed operation of the first conveying platform 11 and the second conveying platform 12.

Further, referring to FIGS. 1 to 3, in an embodiment provided by the present application, the first conveying platform 11 includes a first horizontal plane 111 and an inclined plane 112 extending downwardly, and the inclined plane 112 abuts on an inner side of the first horizontal plane 111. Specifically, the first horizontal plane 111 and the inclined plane 112 form the top surface of the first conveying platform 11, and the inclined plane 112 extends downwardly in an inclined manner in a direction away from the second conveying platform 12 from an edge on one side of the first horizontal plane 111 away from the second conveying platform 12, so that the workpieces 2 can fall into the storage device along a parabolic trajectory and gather near the center of the inner hole of the first conveying platform 11 through the guidance of the inclined plane 112, thus avoiding the recycled workpieces 2 from falling near the wall of the inner hole of the first conveying platform 11 or getting jammed in the gap between the first conveying platform 11 and the storage device.

Further, referring to FIGS. 1 and 2, in the embodiment where the first conveying platform 11 and the second conveying platform 12 have an annular structure, the material handling device 1 further includes an arc-shaped baffle 30, which is disposed between the first conveying platform 11 and the second conveying platform 12, and the arc-shaped baffle 30 is disposed directly opposite the feeding position 101, which can stop the workpieces 2 so that the workpieces 2 accumulate on the feeding position 101. Specifically, an inner diameter of the arc-shaped baffle 30 is the same as an outer diameter of the first conveying platform 11, and the arc-shaped baffle 30 is fixed between the first conveying platform 11 and the second conveying platform 12 by the baffle bracket 300 and surrounds the outer side of the feeding position 101 of the first conveying platform 11. When the feeding assembly 3 blows the workpieces 2 to the feeding position 101 from the feeding inlet 100 through blowing air, the arc-shaped baffle 30 will stop the workpieces 2, so that the workpieces 2 will gather on the first conveying platform 11 to avoid the workpieces 2 from falling on the second conveying platform 12.

Figure 4:
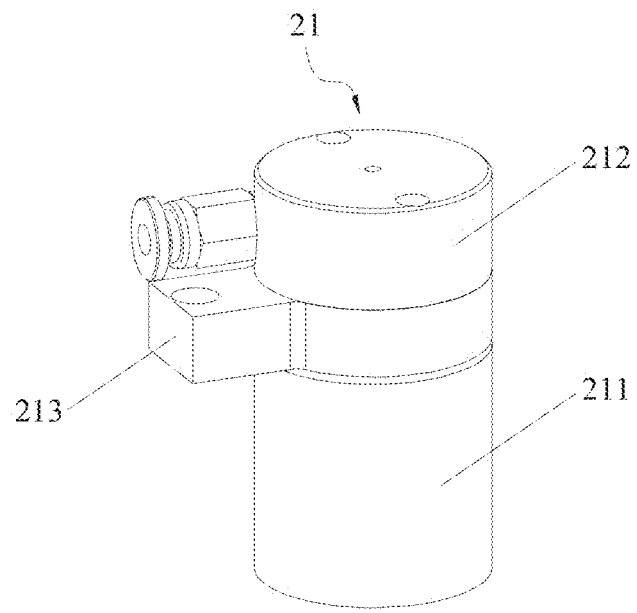
FIG. 4 is a perspective view of the width adjustment assembly of the screening mechanism provided by the embodiment of the present application.

Further, referring to FIGS. 1, 2 and 4, in the embodiment provided by the present application, the screening mechanism includes a width adjustment assembly 21, the width adjustment assembly 21 includes a first roller 211 and a first roller driving member 212. The first roller 211 is arranged on a top side of the first conveying platform 11 and is located downstream of the feeding position 101 for blocking the first conveying platform 11 so that the width on the side of the first conveying platform 11 near the workpiece recycling opening only allows one workpiece 2 to pass through, and the first roller driving member 212 is in a transmission connection with the first roller 211 for driving the first roller 211 to rotate in a direction along which its tangential direction is in line with the moving direction of the workpiece 2, and the rotational speed of the first roller 211 is in line with the conveying speed of the first conveying platform 11. Specifically, the first roller driving member 212 may be an electric motor or pneumatic motor, etc. The first roller driving member 212 is fixed to the top side of the first conveying platform 11 by a width adjustment bracket 213. The first roller 211 is located on a bottom side of the first roller driving member 212 and is fixedly sleeved on an output shaft of the first roller driving member 212. The first roller 211 is in clearance fit with the first conveying platform 11, and the distance from the first roller 211 to the inner edge of the first conveying platform 11 is equal to or slightly greater than the width of one workpiece 2. When more than two workpieces 2 pass the first roller 211 at the same time during the conveying process on the first conveying platform 11, due to the limit of the first roller 211, more than one workpiece 2 away from the first roller 211 will be squeezed out of the first conveying platform 11 by the workpiece 2 close to the first roller 211 and fall into the workpiece recycling opening, while the workpiece 2 in contact with the first roller 211 will pass the width adjustment station smoothly by the rotating force of the first roller 211. This ensures that only one workpiece 2 or a plurality of workpieces 2 stacked on top of each other are retained across the width direction of the first conveying platform 11, and prevents the workpiece 2 from being left stranded at the width adjustment station due to friction. Of course, depending on the specific situation and needs, in other embodiments of the present application, the width adjustment assembly 21 may be a blocking member, the distance of the blocking member to the inner edge of the first conveying platform 11 being equal to or slightly greater than the width of one workpiece 2, so that one workpiece 2 is arranged across the width direction of the first conveying platform 11 by means of the blocking member.

Figure 5:
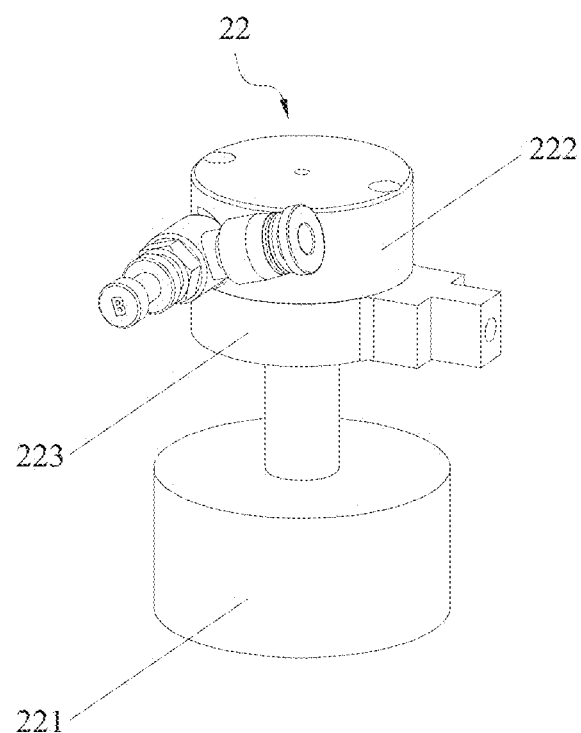
FIG. 5 is a perspective view of the height adjustment assembly of the screening mechanism provided by the embodiment of the present application.
Figure 6:
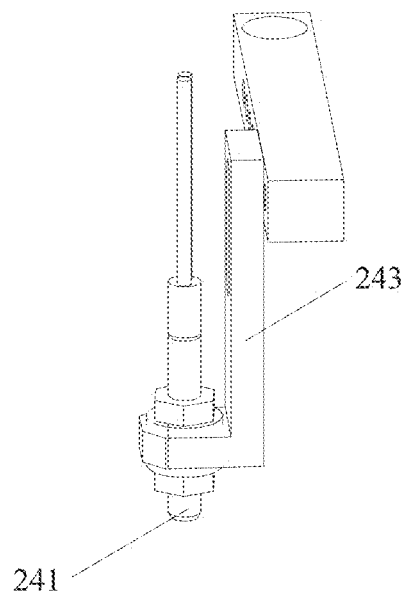
FIG. 6 is a perspective view of the first identification member of the first screening assembly provided by the embodiment of the present application.
Figure 7:
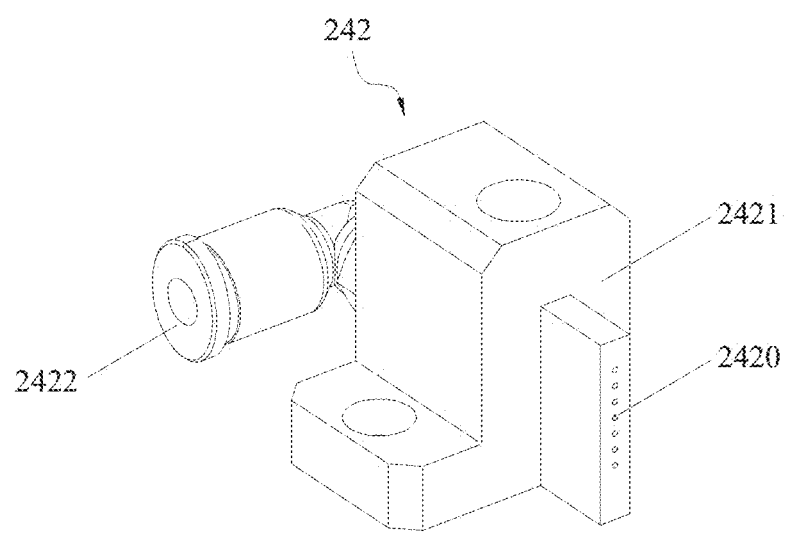
FIG. 7 is a perspective view of the first pick-out member of the first screening assembly provided by the embodiment of the present application.

Further, referring to FIGS. 1, 2 and 5, in the embodiment provided in the present application, the screening mechanism further includes a height adjustment assembly 22, and the height adjustment assembly 22 includes a second roller 221 and a second roller driving member 222. The second roller 221 is disposed on the top side of the first conveying platform 11 and is located downstream of the width adjustment station. The distance between a bottom surface of the second roller 221 and the top surface of the first conveying platform 11 is such that a workpiece 2 in its lowest attitude can pass through. The second roller driving member 222 is in a transmission connection with the second roller 221 for driving the second roller 221 to rotate so as to drive the stacked workpieces 2 into the workpiece recycling opening. Specifically, the second roller driving member 222 may be an electric motor or pneumatic motor, etc., and the second roller driving member 222 is fixed to the top side of the first conveying platform 11 by a height adjustment bracket 223, and the second roller 221 is located on a bottom side of the second roller driving member 222 and is fixedly connected to an output shaft of the second roller driving member 222. The distance from the bottom surface of the second roller 221 to the top surface of the first conveying platform 11 is equal to or slightly greater than the height of a workpiece 2 in its lowest attitude, and when two or more stacked workpieces 2 pass the bottom side of the second roller 221 during the conveying process on the first conveying platform 11, a workpiece 2 above the lowest attitude and close to the second roller 221 will be obstructed by the second roller 221 and separated from the workpiece 2 underneath by the limit of the second roller 221, and then leave the first conveying platform 11 and fall into the workpiece recycling opening driven by the rotational force of the second roller 221. This ensures that only one workpiece 2 is retained in the height direction of the first conveying platform 11 and prevents the workpiece 2 from failing to smoothly leave the first conveying platform 11 and fall into the workpiece recycling opening due to frictional forces. Of course, depending on the specific situation and needs, in other embodiments of the present application, the height adjustment assembly 22 may be a blocking member, the distance from a bottom surface of the blocking member to the top surface of the first conveying platform 11 is equal to or slightly greater than the height of a workpiece 2 in its lowest attitude, and a blocking surface of the blocking member in contact with the workpiece 2 is a beveled or curved surface inclined toward the workpiece recycling opening along the forward direction of the workpiece 2.

Further, referring to FIGS. 1, 2 and 4, in the embodiment provided by the present application, the screening mechanism further includes a first guiding assembly 23, the first guiding assembly 23 includes a third roller and a third roller driving member. The third roller is provided on the top side of the first conveying platform 11 and is located downstream of the height adjustment station, and the third roller driving member is in a transmission connection with the third roller for driving the third roller to rotate to move the workpieces 2 toward the second conveying platform 12. Specifically, the first guiding assembly 23 has the same structure as the width adjustment assembly 21, but the shape and size of the two are slightly different, the volume of the first guiding assembly 23 is smaller than the volume of the width adjustment assembly 21. Here, a plurality of first guiding assemblies 23 are provided, and the plurality of first guiding assemblies 23 are arranged successively along the forward direction of the workpieces 2. The axes of the plurality of third rollers are aligned in a straight line or an arc inclined from one side of the first conveying platform 11 to one side of the second conveying platform 12, and the plurality of third rollers can block the workpieces 2 conveyed on the first conveying platform 11 and transfer them to the second conveying platform 12, and since the workpieces 2 only have rolling friction with the third rollers during this process, the transition of the workpieces 2 from the first conveying platform 11 to the second conveying platform 12 can be conducted more smoothly. Of course, depending on the specific situation and needs, in other embodiments of the present application, the first guiding assembly 23 may be a baffle plate, which extends obliquely from one side of the first conveying platform 11 to one side of the second conveying platform 12 along the forward direction of the workpieces 2.

Further, referring to FIGS. 1 to 3, in the embodiment where the first conveying platform 11 and the second conveying platform 12 have an annular structure, a deceleration belt 122 is provided at an edge of the second conveying platform 12 close to the first conveying platform 11, and a third roller of the first guiding assembly 23 is disposed on the top side of the deceleration belt 122, which can drive the workpieces 2 toward the side of the second conveying platform 12 away from the deceleration belt 122. Specifically, the second conveying platform 12 includes a second horizontal plane 121, and the deceleration belt 122 is provided at an edge of the second horizontal plane 121 close to the first horizontal plane 111 of the first conveying platform 11. The deceleration belt 122 is coplanar with the first horizontal plane 111, and the deceleration belt 122 is a transition area between the first horizontal plane 111 and the second horizontal plane 121, which can provide a larger frictional force. When the workpieces 2 are driven by the first guiding assembly 23 from one side of the first conveying platform 11 to one side of the second conveying platform 12, the workpieces 2 will first decelerate and gather at the deceleration belt 122 under the action of friction, and then enter the side of the second horizontal plane 121 away from the deceleration belt 122 one by one, so as to prevent discontinuity in the feeding of materials on the second conveying platform 12 and make the workpieces 2 continuously arranged on the second conveying platform 12 with a certain spacing.

Further, referring to FIGS. 1, 2, 6 and 7, in the embodiment provided in the present application, the screening mechanism further includes a first screening assembly 24, the first screening assembly 24 includes a first identification member 241 and a first pick-out member 242. The first identification member 241 is disposed on the top side of the second conveying platform 12 and is located downstream of the first guiding station for identifying the attitude of the workpieces 2. The first pick-out member 242 is disposed on a side of the second conveying platform 12 away from the workpiece recycling opening and is located downstream of the first identification station for sending a workpiece 2 identified as unqualified by the first identification member 241 into the workpiece recycling opening. Specifically, the first identification member 241 may be a fiber optic sensor or CCD (charge coupled device) image sensor, etc., and the first identification member 241 is fixed on the top side of the second conveying platform 12 by the first identification bracket 243, and a sensing head of the first identification member 241 faces the top surface of the second conveying platform 12, and when a workpiece 2 is conveyed to the detection range of the first identification member 241, the attitude of the workpiece 2 can be identified by the first identification member 241, so as to provide the control device with a basis for determining whether the workpiece 2 meets the assembly requirements; and the first pick-out member 242 includes a first chamber 2421 and an air inlet 2422, the air inlet 2422 is connected to the first chamber 2421 and in communication with an inner cavity of the first chamber 2421 for connection with an air pump, and a spray nozzle 2420 is protruded on the chamber wall of the first chamber 2421, and a spraying direction of the spray nozzle 2420 is parallel to the top surface of the second conveying platform 12, and an air aperture of the spray nozzle 2420 faces the workpiece recycling opening. When the air inlet 2422 is on, the spray nozzle 2420 blows air to the top surface of the second conveying platform 12, and the workpiece 2 identified as unqualified by the first identification member 241 can be kicked out of the second conveying platform 12 and sent to the workpiece recycling opening. Of course, according to the specific situation and needs, in other embodiments of this application, the first pick-out member 242 may be a cylinder, and when the first pick-out member 242 is activated, a piston rod of the first pick-out member 242 will extend outward to kick the workpiece 2 out of the second conveying platform 12 and send it into the workpiece recycling opening.

Further, referring to FIGS. 1, 2, 6 and 7, in the embodiment provided in the present application, the screening mechanism further includes a second screening assembly 25, and the second screening assembly 25 includes a second identification member 251 and a second pick-out member 252. The second identification member 251 is disposed on the top side of the second conveying platform 12 and is located downstream of the first pick-out station for identifying the attitude of the workpieces 2, and the second pick-out member 252 is disposed on a side of the second conveying platform 12 away from the workpiece recycling opening and is located downstream of the second identification station for sending the workpiece 2 identified as unqualified by the second identification member 251 into the workpiece recycling opening. Specifically, the structure of the second identification member 251 is consistent with the structure of the first identification member 241, and the second identification member 251 can carry out secondary attitude identification of the workpieces 2, thus improving the detection accuracy of the workpieces 2 and preventing detection misses of the first identification member 241 or the failure of the first identification member 241 which fails to provide the control device with a basis for determining whether the workpieces 2 meet the assembly requirements. At the same time, the first pick-out member 242 may be positioned between the second identification member 251 and the discharging position 102 for kicking out the workpiece 2 that fails the secondary detection from the second conveying platform 12 and sending it to the workpiece recycling opening; or it may be positioned between the first identification member 241 and the second identification member 251 and only used for kicking out the workpiece 2 that is identified as unqualified by the first identification member 241 from the second conveying platform 12 and sending it to the workpiece recycling opening, at this time, in order to kick the workpiece 2 identified as unqualified by the second identification member 251 out of the second conveying platform 12 and into the workpiece recycling opening, a second pick-out member 252 can be additionally provided between the second identification member 251 and the discharging position 102, and the structure of the second pick-out member 252 is the same as the structure of the first pick-out member 242.

Further, referring to FIGS. 1, 2, 6 and 7, in the embodiment provided by the present application, the screening mechanism further includes a second guiding assembly 26, and the second guiding assembly 26 includes a fourth roller and a fourth roller driving member. The fourth roller is disposed on the top side of the first conveying platform 11 and is located at the discharging position 102, and the fourth roller driving member is in a transmission connection with the fourth roller for driving the fourth roller to rotate so as to move the workpiece 2 toward the discharging outlet 400. Specifically, the discharging outlet 400 is provided at the discharging position 102, and the discharging outlet 400 is abutted to the second conveying platform 12. The structure of the second guiding assembly 26 is substantially the same as that of the width adjustment assembly 21 or the height adjustment assembly 22, which can guide the workpiece 2 on the first conveying platform 11 to the second conveying platform 12, so that the workpiece 2 are discharged out of the material handling device 1 through the discharging outlet 400 along the second conveying platform 12.

Further, referring to FIGS. 1 and 2, in the embodiment provided by the present application, the material handling device 1 further includes a shield board 40, which is disposed on a side of the second conveying platform 12 away from the first conveying platform 11 and can block the workpieces 2 from falling off the second conveying platform 12 from the side of the second conveying platform 12 away from the first conveying platform 11; and the first roller driving member 212, the second roller driving member 222, the third roller driving member, the fourth roller driving member, the first identification member 241, the first pick-out member 242, the second identification member 251 and the second pick-out member 252 are mounted on the shield board 40. Specifically, the arc-shaped baffle 30 is fixed to the shield board 40 by the baffle bracket 300, the first roller driving member 212 is fixed to the shield board 40 by the width adjustment bracket 213, the second roller driving member 222 is fixed to the shield board 40 by the height adjustment bracket 223, the third roller driving member is fixed to the shield board 40 by the first guiding bracket, the fourth roller driving member is fixed to the shield board 40 by the second guiding bracket, the first identification member 241 is fixed to the shield board 40 by the first identification bracket 243, the second identification member 251 is fixed to the shield board 40 by the second identification bracket, the first pick-out member 242 is fixed to the shield board 40 by the first chamber, and the second pick-out member 252 is fixed to the shield board 40 by the second chamber, so that the screening mechanism and the conveying mechanism 10 are tightly combined, making the whole material handling device 1 more compact.

The above are only optional embodiments of the present application, and are not intended to limit the present application. For those skilled in the art, various modifications and changes may be made to this application. Any modifications, equivalent replacements, improvements, and the like made within the spirit and principles of the present application shall fall within the scope of the claims of the present application.

What is claimed is:

1. A material handling device, comprising:
    a conveying mechanism, comprising a first conveying platform and a second conveying platform which are co-planar and arranged alongside each other, the first conveying platform being provided with a feeding position, the second conveying platform being provided with a discharging position, a conveying speed of the second conveying platform being greater than a conveying speed of the first conveying platform, so that workpieces are arranged at intervals and output at a high speed; and
    a screening mechanism, disposed between the feeding position and the discharging position, and the screening mechanism being disposed on a top side of the first conveying platform and a top side of the second conveying platform for smoothly transitioning the workpieces from the first conveying platform to the second conveying platform and for outputting the workpieces one by one from the discharging position in a desired attitude;
    wherein the first conveying platform and the second conveying platform have an annular shape, the first conveying platform and the second conveying platform are coaxial, the first conveying platform surrounds an outer periphery of a feeding inlet, and the second conveying platform surrounds an outer periphery of the first conveying platform.

2. The material handling device according to claim 1, wherein the first conveying platform comprises a first horizontal plane and an inclined plane extending downwardly in an oblique manner, and the inclined plane is abutted to an inner side of the first horizontal plane.

3. The material handling device according to claim 1, further comprising:
    an arc-shaped baffle, disposed between the first conveying platform and the second conveying platform and aligned with the feeding position, to block the workpieces so that the workpieces accumulate on the feeding position.

4. The material handling device according to claim 1, wherein the screening mechanism comprises:
    a width adjustment assembly, the width adjustment assembly comprising a first roller and a first roller driving member, the first roller being disposed on the top side of the first conveying platform and located downstream of the feeding position for obstructing the first conveying platform so that a width on a side of the first conveying platform close to a workpiece recycling opening only allows one workpiece to pass, and the first roller driving member being in a transmission connection to the first roller for driving the first roller to rotate in a direction along which a tangential direction of the first roller is in line with a moving direction of the one workpiece, and a rotation speed of the first roller being in line with the conveying speed of the first conveying platform.

5. The material handling device according to claim 4, wherein the screening mechanism further comprises:
a height adjustment assembly, the height adjustment assembly including a second roller and a second roller driving member, the second roller being provided on the top side of the first conveying platform and located downstream of a width adjustment station, and a distance between a bottom surface of the second roller and a top surface of the first conveying platform allowing a workpiece in a lowest attitude to pass, the second roller driving member being in a transmission connection with the second roller for driving the second roller to rotate so as to force stacked workpieces to fall into the workpiece recycling opening.

6. The material handling device according to claim 5, wherein the screening mechanism further comprises:
a first guiding assembly, the first guiding assembly comprising a third roller and a third roller driving member, the third roller being disposed on the top side of the first conveying platform and located downstream of a height adjustment station, and the third roller driving member being in a transmission connection with the third roller for driving the third roller to rotate so as to force the workpiece to move toward the second conveying platform.

7. The material handling device according to claim 6, wherein a deceleration belt is disposed on an edge of the second conveying platform close to the first conveying platform, and the third roller is disposed on a top side of the deceleration belt to drive the workpiece toward a side of the second conveying platform away from the deceleration belt.

8. The material handling device according to claim 6, wherein the screening mechanism further comprises:
a first screening assembly, the first screening assembly comprising a first identification member and a first pick-out member, the first identification member being disposed on the top side of the second conveying platform and located downstream of a first guiding station for identifying an attitude of the workpiece, and the first pick-out member being located on a side of the second conveying platform away from the workpiece recycling opening and downstream of a first identification station for sending an unqualified workpiece identified by the first identification member into the workpiece recycling opening.

9. The material handling device according to claim 8, wherein the screening mechanism further comprises:
a second screening assembly, the second screening assembly comprising a second identification member and a second pick-out member, the second identification member being disposed on the top side of the second conveying platform and located downstream of a first pick-out station for identifying the attitude of the workpiece, and the second pick-out member being disposed on the side of the second conveying platform away from the workpiece recycling opening and located downstream of a second identification station for sending an unqualified workpiece identified by the second identification member into the workpiece recycling opening.

10. The material handling device according to claim 8, wherein the screening mechanism further comprises:
a second guiding assembly, the second guiding assembly comprising a fourth roller and a fourth roller driving member, the fourth roller being disposed on the top side of the first conveying platform and located at the discharging position, the fourth roller driving member being in a transmission connection with the fourth roller for driving the fourth roller to rotate so as to move the workpiece toward a discharging opening.

11. The material handling device according to claim 10, further comprising:
a shield board, disposed on a side of the second conveying platform away from the first conveying platform, so as to prevent the workpiece from falling off the second conveying platform from the side away from the first conveying platform; the first roller driving member, the second roller driving member, the third roller driving member, the fourth roller driving member, the first identification member and the first pick-out member being mounted on the shield board.

12. The material handling device according to claim 9, wherein the screening mechanism further comprises:
a second guiding assembly, the second guiding assembly comprising a fourth roller and a fourth roller driving member, the fourth roller being disposed on the top side of the first conveying platform and located at the discharging position, the fourth roller driving member being in a transmission connection with the fourth roller for driving the fourth roller to rotate so as to move the workpiece toward a discharging opening.

13. The material handling device according to claim 12, further comprising:
a shield board, disposed on a side of the second conveying platform away from the first conveying platform, so as to prevent the workpiece from falling off the second conveying platform from the side away from the first conveying platform; the first roller driving member, the second roller driving member, the third roller driving member, the fourth roller driving member, the first identification member and the first pick-out member being mounted on the shield board.

* * * * *